United States Patent
Van Lookeren Campagne et al.

(10) Patent No.: US 9,155,972 B2
(45) Date of Patent: Oct. 13, 2015

(54) MOTION PLATFORM SYSTEM

(71) Applicant: E2M TECHNOLOGIES B.V., Amsterdam (NL)

(72) Inventors: Pieter Van Lookeren Campagne, Amsterdam (NL); Rabih El Zaher, Amsterdam (NL)

(73) Assignee: E2M TECHNOLOGIES B.V., Amsterdam (NL)

( * ) Notice: Subject to any disclaimer, the term of this patent is extended or adjusted under 35 U.S.C. 154(b) by 378 days.

(21) Appl. No.: 13/626,343

(22) Filed: Sep. 25, 2012

(65) Prior Publication Data

US 2013/0087005 A1    Apr. 11, 2013

(30) Foreign Application Priority Data

Oct. 7, 2011 (NL) .................................... 2007550

(51) Int. Cl.
*G05G 11/00* (2006.01)
*A63G 31/16* (2006.01)
*G09B 9/12* (2006.01)

(52) U.S. Cl.
CPC ........ *A63G 31/16* (2013.01); *G09B 9/12* (2013.01); *Y10T 74/20348* (2015.01)

(58) Field of Classification Search
CPC ...... B25J 17/0275; B25J 3/04; B25J 17/0283; B25J 9/102; B25J 9/106
USPC ............... 74/490.01, 490.07, 490.08, 490.09, 74/490.1, 490.14
See application file for complete search history.

(56) References Cited

U.S. PATENT DOCUMENTS

| | | | | |
|---|---|---|---|---|
| 5,399,951 | A  * | 3/1995 | Lavallee et al. | 318/567 |
| 5,419,674 | A  * | 5/1995 | Chang | 198/750.11 |
| 5,966,991 | A  * | 10/1999 | Gosselin et al. | 74/490.1 |
| 6,543,987 | B2 * | 4/2003 | Ehrat | 414/735 |
| 6,634,885 | B2 | 10/2003 | Hodgetts et al. | |
| 8,142,420 | B2 * | 3/2012 | Schena | 606/1 |
| 8,167,872 | B2 * | 5/2012 | Schena | 606/1 |
| 8,167,873 | B2 * | 5/2012 | Schena | 606/1 |
| 8,298,845 | B2 | 10/2012 | Childress | |
| 8,429,998 | B2 * | 4/2013 | Feng | 74/490.1 |
| 8,469,945 | B2 * | 6/2013 | Schena | 606/1 |
| 8,839,690 | B2 * | 9/2014 | Huang et al. | 74/490.06 |
| 8,876,077 | B2 * | 11/2014 | Maillard | 248/487 |
| 2002/0055086 | A1 * | 5/2002 | Hodgetts et al. | 434/37 |
| 2002/0164560 | A1 | 11/2002 | Borta | |

(Continued)

OTHER PUBLICATIONS

International Search Report and Written Opinion of NL 2007550; Apr. 17, 2012; 9 pgs.

*Primary Examiner* — David M Fenstermacher
(74) *Attorney, Agent, or Firm* — Gardner Groff Greenwald & Villanueva, PC

(57) ABSTRACT

A motion platform system comprising a motion platform which is supported above a base by displacement units. Displacement units comprise a drive unit which drives a crank. A connecting arm is connected between the crank and the motion platform, so that translational and tilting movement of the motion platform is achieved by appropriate operation of the drive units. Each connecting arm has a curved profile which enables a full range of movement of the motion platform to be achieved using connecting arms of relatively short length. The connection between the connecting arm and the crank arm can be brought close to, or within, the crank arm. The height of the motion platform above the base, and bearing loads within the drive units, can thus be reduced.

10 Claims, 4 Drawing Sheets

(56) References Cited

U.S. PATENT DOCUMENTS

| | | | |
|---|---|---|---|
| 2004/0024387 A1* | 2/2004 | Payandeh et al. | 606/1 |
| 2005/0178230 A1* | 8/2005 | Wattyn | 74/490.09 |
| 2007/0138374 A1* | 6/2007 | Nishibashi et al. | 250/208.1 |
| 2007/0144299 A1* | 6/2007 | Okazaki | 74/490.1 |
| 2007/0173788 A1* | 7/2007 | Schena | 606/1 |
| 2007/0173789 A1* | 7/2007 | Schena | 606/1 |
| 2007/0173975 A1* | 7/2007 | Schena | 700/245 |
| 2008/0202273 A1* | 8/2008 | Wood | 74/490.1 |
| 2009/0301253 A1* | 12/2009 | Nishida et al. | 74/490.01 |
| 2010/0005919 A1* | 1/2010 | Breu | 74/490.05 |
| 2010/0139436 A1* | 6/2010 | Kawashima et al. | 74/490.01 |
| 2011/0146440 A1* | 6/2011 | Feng | 74/490.1 |
| 2011/0259139 A1* | 10/2011 | Wang et al. | 74/490.09 |
| 2014/0033854 A1* | 2/2014 | Hosaka | 74/490.09 |
| 2014/0238178 A1* | 8/2014 | Ejma et al. | 74/490.09 |

* cited by examiner

MOTION PLATFORM SYSTEM

CROSS-REFERENCE TO RELATED APPLICATION

This application claims priority under 35 U.S.C. §119 to Netherlands Patent Application No. NL2007550 filed Oct. 7, 2011. Netherlands Patent Application No. NL2007550 is incorporated herein by reference in its entirety for all purposes.

TECHNICAL FIELD

This invention relates to a motion platform system, and is particularly, although not exclusively, concerned with a motion platform system for use as part of a simulator, for example an aircraft or land vehicle simulator.

BACKGROUND

Simulators are known for simulating the behavior of aircraft, land vehicles such as racing or rally cars, and other machinery. Such simulators are used for training or entertainment, and typically comprise a motion platform system which supports equipment such as a pilot's or driver's seat and associated controls. One or more video screens represent the view through the windscreen of the vehicle. The motion platform system operates to move the motion platform to simulate the effects of acceleration on the driver or pilot. These simulated effects are coordinated with the view on the video screen or screens, and may simulate the effects on the pilot or driver of accelerations resulting from gravity, centrifugal forces, acceleration and braking, etc. resulting from inputs to the controls as well as 'external' factors such as road surface or contour, or turbulence.

An example of a motion platform system is disclosed in US 2002/0055086, and comprises a motion platform supported by connecting arms through which motion is transmitted to the platform from electric drive motors. The drive motors receive signals from software controlling the simulator to move the platform into a sequence of positions corresponding to the simulated effects to be achieved. US 2002/0055086 discloses a six-axis motion platform system, and so is capable of moving the platform in translation and rotation with respect to an orthogonal coordinate frame of reference. The system thus has six degree of freedom, namely three translational and three rotational degrees of freedom.

The drive motors act on the connecting arms through crank arms which are capable of 360° rotation about the axis of output shafts of the drive motors. During operation of the simulator, very high loads are applied on the crank arms by the connecting arms, and these apply substantial bending moments to the output shafts. Furthermore, the connecting arms not only pivot relatively to the crank arms about pivot axes parallel to the output shaft axis, but also swing inwards and outwards as the motion platform undergoes translational displacement under the action of the other connecting arms.

In order to accommodate the complex interrelated motions of the connecting arms of the system, it has been necessary for the connecting arms to be relatively long, which results in a relatively large height of the motion platform above the base of the system. There is a demand for this height to be reduced, but this requires a reduction in the length of the connecting arms, which in turn causes the connecting arms to undergo a greater range of pivotal movement relative to the respective crank arms. This can cause the movement envelopes of the connecting arms to clash with other parts of the system. The risk of clashing can be reduced by extending the length of crank pins by which the connecting arms are connected to the crank arms, but this increases the moment arm of the bending moments applied by the connecting arms to the output shafts of the drive motors. This increases the loading applied to bearings supporting the output shafts and so can lead to early bearing failure. An alternative solution to the problem is to program the software to restrict the range of movement of the motion platform to positions which do not cause interference between the control arms and other parts of the system. This reduces the versatility of the system, and also requires physical hard stops to be provided to limit movement should excursions from the permitted movement envelope occur as a result of component failure or programming error.

SUMMARY

Accordingly it is therefore an object of this invention to provide a motion platform which may be designed with a reduced height. This object is achieved by the following motion platform.

According to the present invention there is provided a motion platform system comprising a motion platform which is supported on a base by a displacement mechanism comprising a plurality of displacement units, each displacement unit comprising a drive unit having a rotational output member, a crank arm driveable by the output member, and a connecting arm connected to the crank arm and to the platform by first and second connection means at its respective ends, the first connection means comprising a 3-axis bearing situated at a position away from the axis of the output member, the connecting arm having a configuration such that a portion of the connecting arm is offset laterally from a straight line extending between the first and second connection means.

Applicants now found that by providing that a portion of the arm is offset laterally from the straight line between the first and second connection means it is possible to reduce the moment arm between the plane containing the 3-axis bearing and the plane of the drive unit and especially the plane of the bearings of the drive unit. By being able to reduce this arm the bending moment can be significantly reduced resulting in that the life time of the drive unit and especially the life time of its bearings can be significantly extended and a platform can be obtained having a reduced height.

By offset is meant that the connecting arm which transfers the force from the first and second connection means is offset from the direct line between said points. The offset portion may have any form. The connecting arm will suitably follow the shortest distance between said first and second connection means, apart from the offset, resulting in that the connecting means will be present in one plane as shown in the Figures. The offset of each connecting arm may suitably provide a concave region in the profile of the connecting arm which accommodates the crank arm during operation of the system. Concave regions are preferred because it results in a minimum of stress in the connecting arm.

The motion platform will in use be able to move in its motion envelope. The design of the different components should be such that in all possible positions in the movement envelope of the motion platform, the connecting arm and the respective crank arm, or other parts of the system do not contact. The invention is especially directed to motion platforms wherein a straight line extending between the first and second connection means would run through the respective crank arm or other parts of the system in at least a possible position of the movement envelope of the motion platform.

The 3-axis bearing may comprise a spherical bearing element which is pivotable within a complementary spherical surface. In one embodiment, the spherical bearing element is carried by a crank pin fixed to the crank arm, and the spherical surface is provided within the connecting arm. In an alternative embodiment, the spherical bearing element is carried by a lateral extension of the connecting arm, and the spherical surface is provided within the crank arm.

The connecting arm may comprise a connecting arm body and a pin secured to the body to provide the lateral extension.

The connecting arm may comprise a support housing and a pin providing the lateral extension. The pin is rotatable within the support body.

The connecting arm of each displacement unit may be smoothly curved between the first and second connection means. In one embodiment in accordance with the present invention, the connecting arm may have the configuration of a 'lazy S'.

The connecting arm may have a flat profile which is disposed parallel to the rotational axis of the output member. The connecting arm may be constructed from two parallel spaced apart plates.

The second connection means may comprise a 2-axis joint such as a universal joint.

In a specific embodiment, the drive unit of each displacement unit comprises an electric motor. The motor may drive the crank arm directly, or through a reduction gear, in which case the rotational output member is the output member of the reduction gear.

The system may comprise a six-axis system.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

For a better understanding of the present invention, and to show more clearly how it may be carried into effect, reference will be made, by way of example, to the accompanying drawings, in which.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
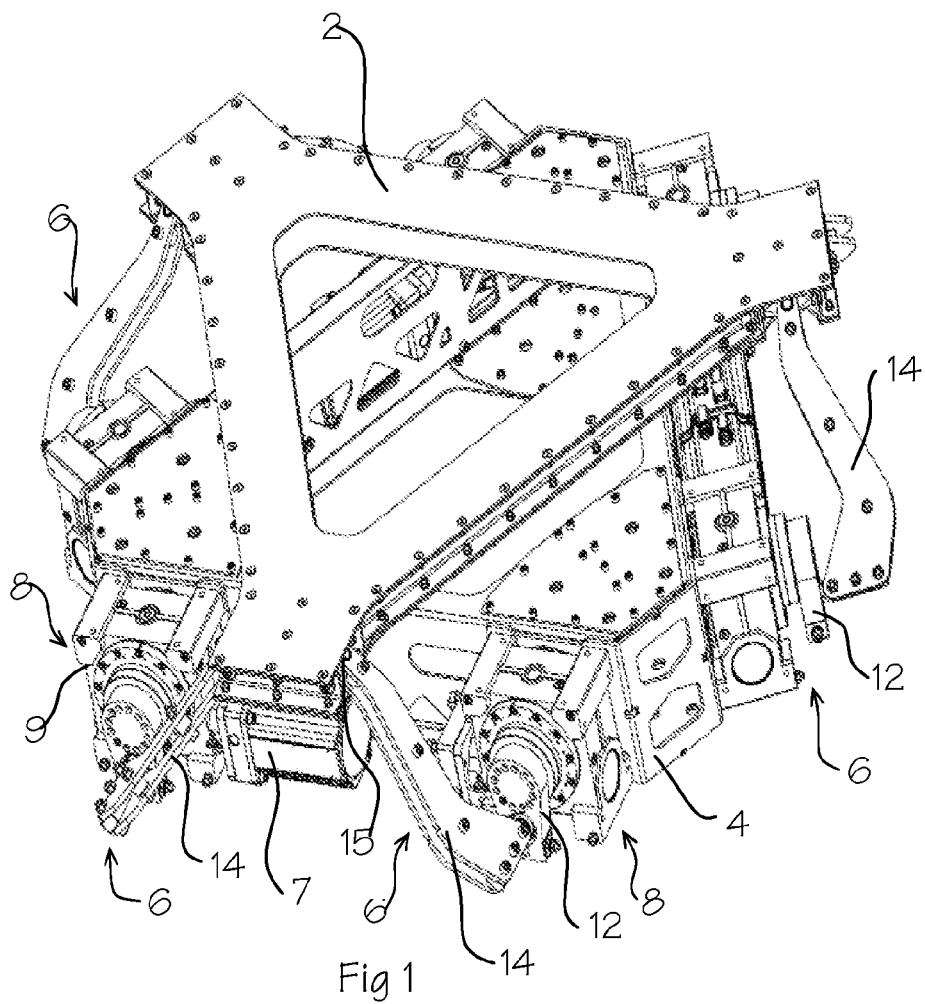
FIG. 1 is a perspective view of a motion platform system in accordance with the present invention.
Figure 2:
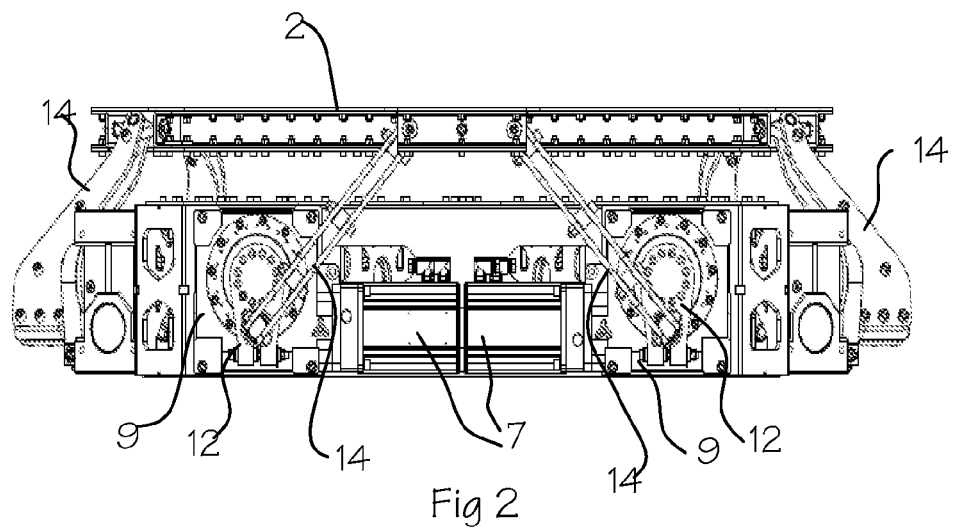
FIG. 2 is a side view of the system of FIG. 1.

The system shown in FIGS. 1 and 2 is a six-axis system (i.e. providing six degrees of freedom) comprising a motion platform 2 which can be displaced in translation in any direction and rotated about any axis, within an orthogonal coordinate system. The motion platform 2 is supported on a base 4 by a displacement mechanism which comprises six displacement units 6.

The motion platform 2 is generally triangular, and the displacement units 6 are grouped in pairs, with the units of each pair supporting the motion platform 2 at a respective corner.

Each displacement unit 6 comprises a drive unit 8 in the form of an electric motor 7 which drives an output shaft 10 through reduction gearing 9. A crank arm 12 is fixed to the output shaft 10 and, at a position away from the rotational axis of the output shaft 10, is connected to a first end of a connecting arm 14. At its second end, the connecting arm 14 is connected by a universal joint 16 to the motion platform 2.

It will be appreciated that, during operation of the system, the drive unit 8 can rotate the crank arm 12 through a full 360° revolution, so that the first end of the connecting arm 14 can be positioned at any point around a circle centered on the axis of the output shaft 10. Because the first end of the connecting arm 14 moves around a circular path, smooth transitions are achieved at the ends of the strokes of the connecting arm at top dead centre and bottom dead centre, so providing intrinsic safety.

The position and orientation of the motion platform 2 depends on the positions of the individual crank arms 12 of the six displacement units 6. The system is controlled by control software which generates respective outputs for the motor of each drive unit 8. The outputs determine successive target positions for the crank arms 12, as well as speed and acceleration profiles for the crank arms 12.

The control software calculates the output signals on the basis of various inputs in conjunction with stored values for parameters such as vehicle handling characteristics and the surrounding environment, such as road surface characteristics. Additional inputs, such as steering, braking and acceleration inputs provided by the driver of the simulated vehicle, are also input in real time to the control software.

In response to the inputs, the motion platform is moved, either by translational displacement or by tilting, to generate acceleration forces which simulate the forces which would be experienced by the driver of a real vehicle. It will be appreciated that, during operation of the system, the motors of the drive units 8 generate substantial loads in the crank arms 12 and the connecting arms 14.

Figure 3:
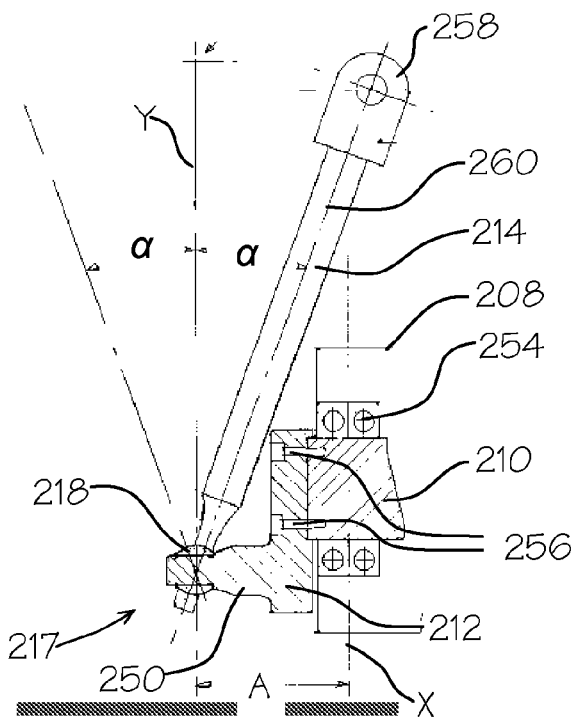
FIG. 3 is a side view of a connecting arm and a crank arm of a known motion platform system.
Figure 4:
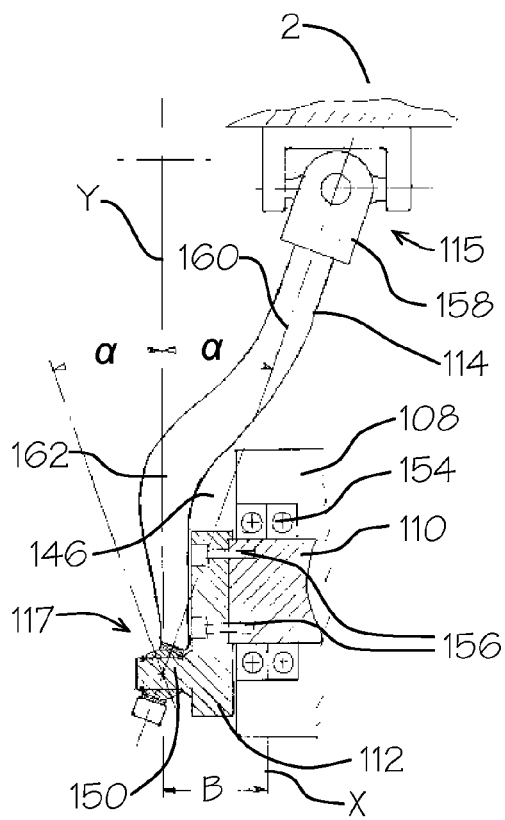
FIG. 4 is a side view of a connecting arm and a crank arm of a motion platform system in accordance with the present invention.
Figure 5:
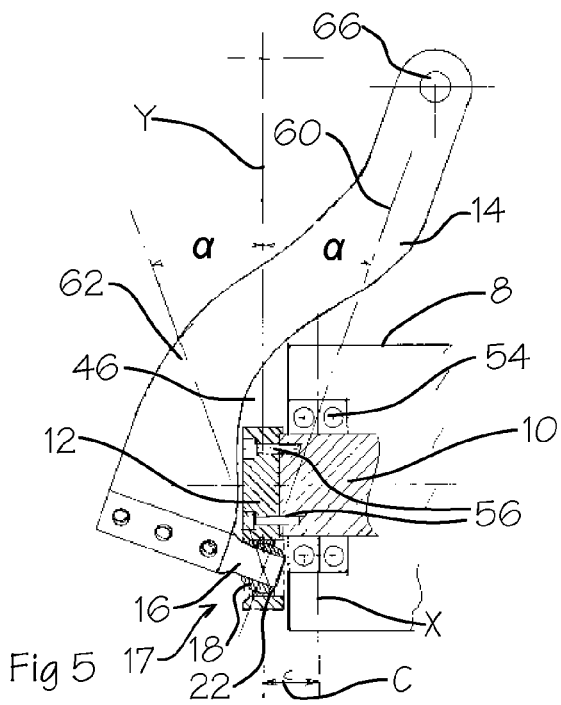
FIG. 5 is a side view of a connecting arm and a crank arm of the motion platform system of FIGS. 1 and 2.

FIGS. 3 to 5 show three variants of the connecting arms, with their respective crank arms. In FIGS. 3 to 5, the same reference numbers are used to designate the same components, although in FIG. 3 they are raised by 200, and in FIG. 4 by 100, relative to FIG. 5.

FIG. 3 shows a connecting arm 214 of a known system, such as that disclosed in US 2002/0055086. The connecting arm 214 is straight, and is connected to the crank arm 212 by first connection means in the form of a 3-axis bearing 217. The bearing 217 comprises a spherical bearing element 218 carried by a crank pin 250 fixed to the crank arm 212. The connecting arm 214 has an internal spherical surface which is complementary to the bearing element 218. The connecting arm 214 can thus pivot or rotate on the spherical bearing element about three orthogonal axes, namely the axis of the crank pin 250 and two axes perpendicular to the axis of the crank pin 250.

The drive unit 108 supports an output member in the form of a gearbox output shaft 210 by means of bearings 254. The central plane of the bearings 254 is indicated by a line X. The crank arm 212 is fixed to the output shaft 210 by bolts 256.

At its end away from the bearing 217, the connecting arm has a fitting 258 forming part of a second connection means by which it is coupled to the motion platform 2 (not shown in FIG. 3). The crank pin 250 is shown at its bottom dead centre position, so that the fitting 258 is at its position of closest approach to the output shaft 210.

In operation of the system shown in FIGS. 1 and 2, the motion platform 2 is displaced and tilted above the base 4 by the combined action of the displacement units 6. If the connecting arms have the form of the connecting arm 214 in FIG. 3, then, during this movement of the motion platform 2, each connecting arm 214 pivots and rotates relatively to the crank arm 212 about the centre of the spherical bearing element 218. This movement includes a swinging motion of the connecting arm 214 about an axis which is perpendicular to the plane of FIG. 3 and passes through the centre of the spherical head 218, which lies in a plane Y parallel to the central plane X of the bearing 254. This motion thus moves the connecting arm 214 away from the central plane Y, to a maximum swing angle α.

It will be appreciated that the movement of the connecting arm 214 towards the central plane X is limited by the presence of the crank arm 212. It is desirable to maximize the travel of the fitting 258 in order to maximize the movement envelope of the motion platform 2, while minimizing the length of the connecting arm 214 in order to minimize the height of the motion platform 2 above the base 4. Consequently, maximum travel of the fitting 258 represented in FIG. 3 can be achieved only by positioning the plane Y, containing the centre of the spherical bearing 218, at a relatively large distance A from the central plane X of the bearings 254 by suitable selection of the length of the crank pin 250.

In operation, a bending moment on the output shaft 210 is created by the loads transmitted by the connecting arm 214 between the motion platform 2 and the crank arm 212. The line of action of the loads is the line 260 connecting the first and second connection means 217, 258, which, in the embodiment of FIG. 3, coincides with the centerline of the connecting arm 214. The moment arm of the bending moment is the distance A between the central planes X and Y. The bending moment is therefore relatively large owing to the length of the crank pin 250, and this can lead to premature failure of the bearings 254.

FIG. 4 shows a modification of the arrangement shown in FIG. 3. In this embodiment, the crank pin 150 is significantly shorter than the crank pin 250 of FIG. 3. The end fitting 158 is shown in FIG. 4 as a yoke of a universal joint 115 providing a t-axis coupling between the connecting arm 114 and the motion platform 2. In order to accommodate the swinging movement of the connecting arm 114 to maintain the maximum travel of the end fitting 158, the connecting arm 114 is curved to provide a portion 162 which is laterally offset from the line 160 extending between the first and second connecting means 117, 115. The lateral offset creates a concave region 146 which accommodates the crank arm 112 in the position shown in FIG. 4.

With this configuration, the moment arm B between the central planes X and Y is significantly reduced by comparison with the moment arm A in FIG. 3, so reducing the bending moment applied to the output shaft 110, and extending the life of the bearings 154.

A further embodiment in accordance with the present invention is represented in FIG. 5, and also in FIGS. 1, 2 and 6 to 8.

In this embodiment, the connecting arm 14 is connected to the crank arm 12 by a first connection means comprising a 3-axis bearing 17. The bearing 17 comprises a spherical bearing element 18 carried by a flattened pin 16. The spherical bearing element 18 of the pin 16 is received in a complementary spherical liner 22 which is retained within the crank arm 12. The pin 16 is fixed rigidly to the connecting arm 14, and consequently the connecting arm 14 is pivotable and rotatable in all directions relatively to the crank arm 12. The connection shown in FIG. 5 is like a hip joint of a human and different from the prior art first connection means known in the cited prior art for motion platforms. In the embodiment shown in FIG. 5, the bearing 17 is a plain bearing. In an alternative embodiment, the liner 22 may be supported in the crank arm 12 by needle rollers so that rotation of the connecting arm 14 is accompanied by rotation of the liner 22 in the crank arm 12, while pivoting movement is accompanied by sliding between the head 18 and the liner 22.

As in the embodiments of FIGS. 3 and 4, the crank arm 12 is rigidly secured to the output shaft by bolts 56.

The end of the connecting arm 14 away from the bearing 17 is connected to the motion platform by second connection means 20 which is a 2-axis connection in the form of a universal joint. The joint comprises a cross 28 having a pair of trunnions which are received in openings 66 in the connecting arm, and a further pair of trunnions which are received in a yoke 30 secured to the motion platform 2. The connecting arm 14 is thus pivotable relatively to the motion platform 2 about two axes, defined by the cross 28, but cannot rotate about its lengthwise axis relatively to the motion platform 2.

Figure 6:
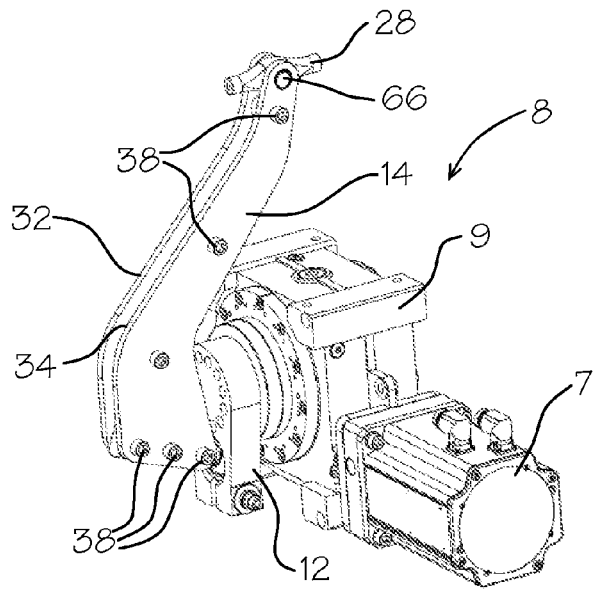
FIG. 6 is a view of a displacement mechanism of the motion platform system of FIGS. 1 and 2.
Figure 7:
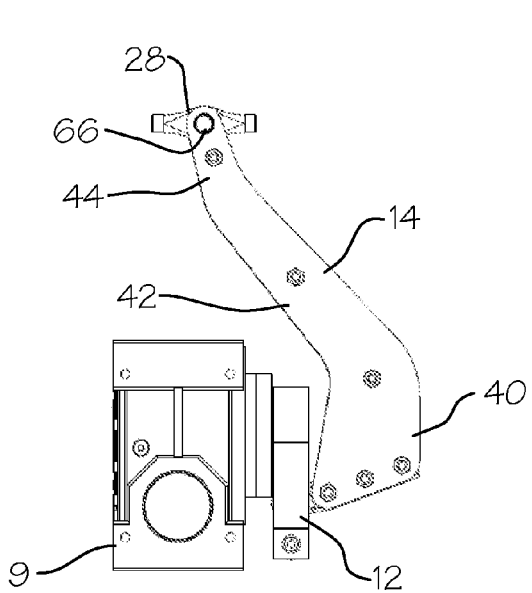
FIG. 7 is a side view of the displacement mechanism of FIG. 6.
Figure 8:
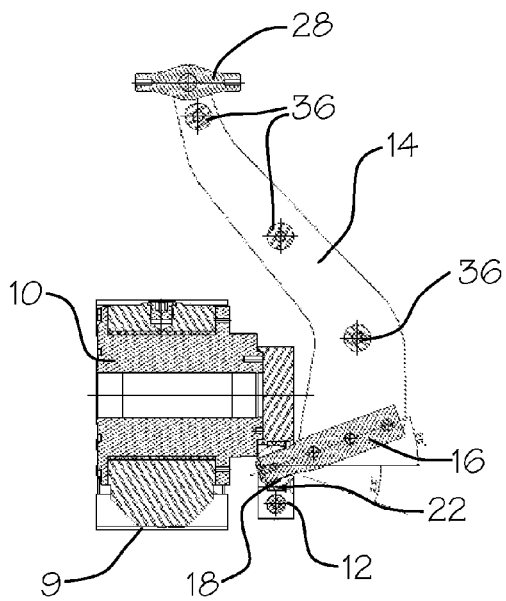
FIG. 8 is a sectional view of the displacement mechanism of FIGS. 6 and 7.
Figure 9:
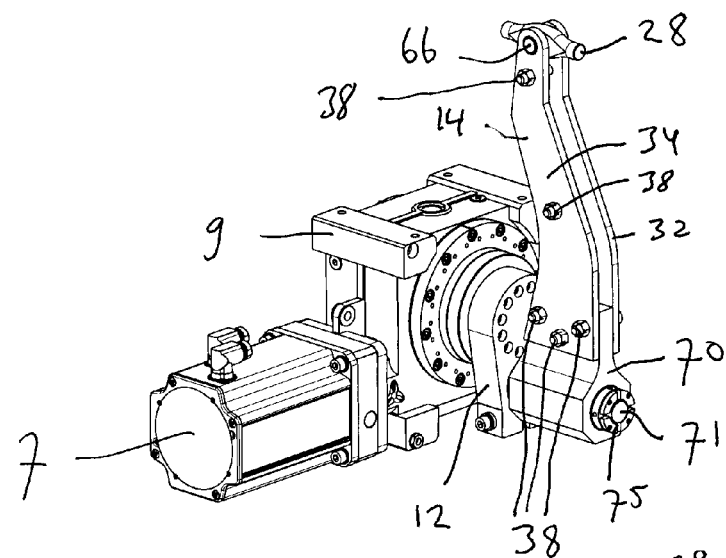
FIG. 9 is an alternative embodiment of the connecting arm and crank arm of FIG. 5.
Figure 10:
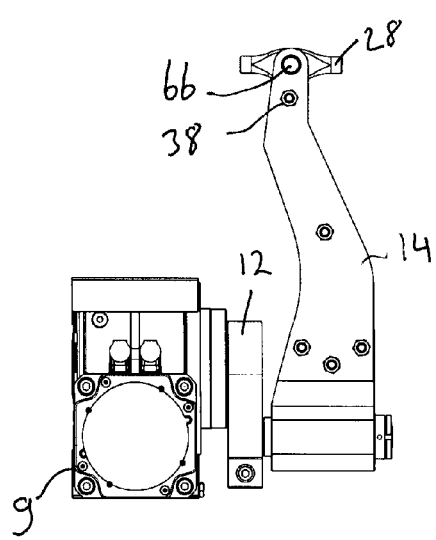
FIG. 10 is a side view of the displacement mechanism of FIG. 9.
Figure 11:
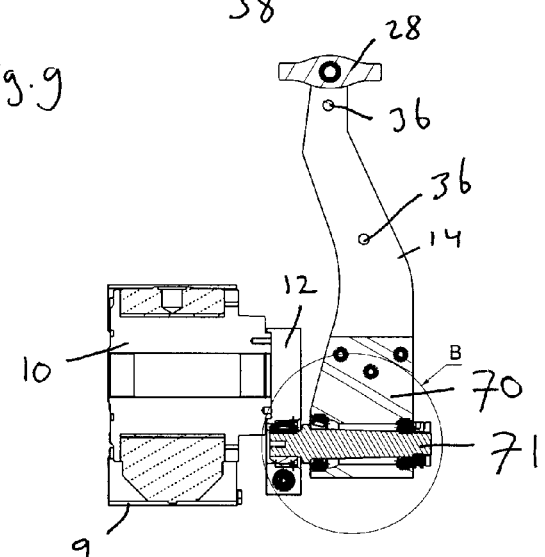
FIG. 11 is a sectional view of the displacement mechanism of FIGS. 9 and 10.
Figure 12:
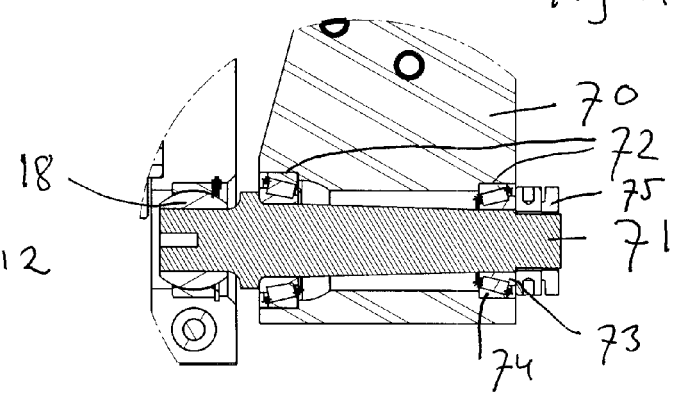
FIG. 12 is an enlarged detail B of FIG. 11.

The connecting arm 14 has a generally flat shape as shown in FIG. 6, and is made from two plates 32, 34 of identical shape. The plates 32, 34 are spaced apart by spacers 36 and by the flattened part of the pin 16 and, and are secured together by suitable fasteners 38 such as nuts and bolts. The cross 28 is supported between the plates 32, 34.

In both FIGS. 4 and 5 it is shown that the straight line extending between the first and second connection means runs through the respective crank arm or other parts of the system in the illustrated position of the movement envelope of the motion platform.

As seen in FIG. 6, the plates 32, 34 overlie one another and have an identical profile which is in the form of a 'lazy S' and tapers in the direction from the bearing 17 to the universal joint 15. Thus, the connecting arm 14 has a first portion 40 which extends obliquely from the pin 16 to an intermediate portion 42 which is inclined to the first portion 40 by a first angle which is less than 90° and is for example in the range 30° to 60°. The intermediate portion 42 extends to a second portion 44, in which the openings 66 are provided, and which is inclined to the intermediate portion 42 at a second angle which is smaller than, and in the opposite direction to, the angle between the first portion 40 and the intermediate portion 42. The second angle may, for example, be in the range 10° to 45°. The second portion 44 is thus offset laterally of the first portion 40 so that, in the position shown in FIGS. 5, 7 and 8 its lies over the drive unit 8. The first and second portions 40, 44 merge with the intermediate portion 42 over smooth curves.

It will be appreciated from FIGS. 5 to 8 that the profile of the connecting arm 14 provides a portion 62 which is laterally offset from the line 60 extending between the first and second connection means 17, 15. The lateral offset creates a concave region 46 formed by the curve between the first portion 40 and the intermediate portion 42 which provides clearance to accommodate the crank arm 12 in the bottom dead centre condition shown in FIGS. 5 to 8. This configuration of the connecting arm 14 thus enables the connecting arm 14 to be relatively short by comparison with the connecting arms of existing motion platform systems, without clashing with the crank arm 12 or other parts of the system.

Furthermore, because the spherical bearing element 18 is received within the crank arm 12, the moment arm C between the central planes X and Y is reduced still further by comparison with the moment arm B in FIG. 4, so giving a further reduction in the bending moment applied to the output shaft 52, and further extending the life of the bearings 54.

FIGS. 9 to 12 show an alternative for the embodiment shown in FIGS. 5 to 8. In this alternative embodiment the pin 71 as provided with the spherical bearing element 18 can rotate relative to the connecting arm 14. For this a roller bearing arrangement 72 is present between pin 71 and connecting arm 14, whereby the axis of the pin 71 is the rotation axis of the bearing arrangement 72. The inside races 73 of the bearings 72 are fitted to the pin 71 and the outside races 74 are fitted within a bearing support housing 70. The bearing support housing 70 is part of arm 14 as shown in these Figures. A nut 75 fixes the pin 71 within the support housing 70 and preloads the bearings 72. The advantage of this configuration is that part of the movement takes place within the bearing support housing and less movement and thus wear takes place at the spherical bearing element 18 as compared to the embodiment of FIGS. 5-8.

The profile of the connecting arm 14 shown in FIGS. 1, 2 and 5 to 12 thus enables a motion platform system to be constructed which is relatively low by comparison with known systems, while retaining the full range of motion of the motion platform 2 and reducing the loading on the bearings of the output shafts 10 of the drive units 8. Furthermore, the connecting arm 14 is relatively simple to construct, by laser cutting the plates 32, 34 from plate stock, for example steel plate, with simple connections to the pin 16 and the cross 28. In addition, the configuration of the connecting arm 14 enables the crank arm 12 to have a thicker configuration.

Although the invention has been described with reference to a six-axis motion platform system, comprising six displacement units 6, it will be appreciated that the principles underlying the present invention can also be applied to motion platform systems having fewer degrees of freedom.

While the invention has been described with reference to preferred and example embodiments, it will be understood by those skilled in the art that a variety of modifications, additions and deletions are within the scope of the invention, as defined by the following claims.

What is claimed is:

1. A motion platform system comprising a motion platform which is supported on a base by a displacement mechanism comprising a plurality of displacement units, each displacement unit comprising a drive unit having a rotational output member, a crank arm driveable by the output member, and a connecting arm connected to the crank arm and to the platform by first and second connection means at respective ends of the connecting arm, the first connection means comprising a 3-axis bearing situated at a position away from the axis of the output member, the connecting arm having a configuration such that a portion of the connecting arm is offset laterally from a straight line extending between the first and second connection means in which the 3-axis bearing comprises a spherical bearing element which is pivotable within a complementary spherical surface and in which the spherical bearing element is carried by a lateral extension of the connecting arm and the spherical surface is provided within the crank arm.

2. A motion platform system as claimed in claim 1, in which the offset portion of the connecting arm defines a concave region in the profile of the connecting arm for accommodating the crank arm during operation.

3. A motion platform system as claimed in claim 1, in which the connecting arm comprises a connecting arm body and a pin secured to the body to provide the lateral extension.

4. A motion platform system as claimed in claim 1, in which the connecting arm comprises a support housing and a pin providing the lateral extension and rotatable within the support body.

5. A motion platform system as claimed in claim 1, in which the connecting arm is smoothly curved between the first and second connection means.

6. A motion platform system as claimed in claim 1, in which the connecting arm has a flat profile disposed parallel to the rotational axis of the output member.

7. A motion platform system as claimed in claim 1, in which the connecting arm comprises two parallel spaced apart plates.

8. A motion platform system as claimed in claim 1, in which the second connection means comprises a two-axis joint.

9. A motion platform system as claimed in claim 1, in which the drive unit comprises an electric motor provided with a reduction gear.

10. A motion platform system as claimed in claim 1, in which the motion platform is a six-axis platform and in which the system comprises six displacement units.

* * * * *